US011163159B1

(12) United States Patent
Rong

(10) Patent No.: US 11,163,159 B1
(45) Date of Patent: Nov. 2, 2021

(54) DISPLAY SYSTEM WITH EXTENDED DISPLAY AREA

(71) Applicant: FACEBOOK TECHNOLOGIES, LLC, Menlo Park, CA (US)

(72) Inventor: Wei Rong, San Jose, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 152 days.

(21) Appl. No.: 16/258,482

(22) Filed: Jan. 25, 2019

(51) Int. Cl.
| | |
|---|---|
| G02B 27/01 | (2006.01) |
| G02B 5/08 | (2006.01) |
| G06T 7/50 | (2017.01) |
| G06F 3/01 | (2006.01) |
| G02B 5/30 | (2006.01) |

(52) U.S. Cl.
CPC ....... G02B 27/0172 (2013.01); G02B 5/0808 (2013.01); G02B 5/3025 (2013.01); G06F 3/013 (2013.01); G06T 7/50 (2017.01)

(58) Field of Classification Search
CPC ............... G02B 27/01; G02B 27/0172; G02B 27/0178; G02B 27/28; G02B 27/288; G02B 27/286; G02B 27/10; G02B 27/27; G02B 27/1006; G02B 27/1026; G02B 5/0808; G02B 5/3025; G02B 5/3033; G02B 17/086; G02B 7/04; G06T 7/50; G06F 3/013
USPC ..... 359/634, 629, 626, 627, 485.01, 487.04, 359/489.07, 489.11
See application file for complete search history.

(56) References Cited

U.S. PATENT DOCUMENTS

| | | | |
|---|---|---|---|
| 6,975,455 B1 * | 12/2005 | Kotchick | G02B 5/305 |
| | | | 359/485.03 |
| 2010/0177113 A1 * | 7/2010 | Gay | G02B 30/27 |
| | | | 345/589 |

\* cited by examiner

*Primary Examiner* — Jie Lei
(74) *Attorney, Agent, or Firm* — Artegis Law Group, LLP

(57) ABSTRACT

One embodiment of the present application sets forth an apparatus that includes a composite display layer that transmits a set of composite light. The composite display layer includes a display layer that provides a first subset of light included in the set of composite light, and a first mirror layer parallel to the first display layer that provides a second subset of light included in the set of composite light, where the second subset of light comprises a reflection of a first portion of the first subset of light. The composite display layer also includes a polarizer layer disposed on the composite display layer, where the polarizer layer provides the first portion of the first subset of light to the first mirror layer.

8 Claims, 6 Drawing Sheets

DISPLAY SYSTEM WITH EXTENDED DISPLAY AREA

BACKGROUND

Field of the Various Embodiments

Embodiments of the present disclosure relate generally to video displays, head-mounted displays and, more specifically, to a display system with an extended active display area.

Description of the Related Art

An optical assembly includes a display assembly and a lens. During operation, the display assembly generates an image by causing pixels included in the display assembly to emit light rays that propagate to the lens. The lens concentrates light rays provided by the display assembly, where the concentrated light rays reach the eye of the user.

The lens has an associated lens coverage area. The lens coverage area of the lens is the area of a particular plane, parallel to the lens at a given distance, which the user can see through the lens. The lens coverage area is based on the configuration of the lens, a distance between the lens and a particular plane, and the field of view of the user, which is distance between the lens and the plane of the user's eye. In some circumstances, however, the configuration of an optical assembly places the display assembly in a position relative to the lens that causes the area of the display assembly to be smaller than the lens coverage area. Such configurations cause the portions of the lens coverage area remain unused and may cause less light to reach the eye of the user.

SUMMARY

One embodiment of the present application sets forth an apparatus that includes a composite display layer that transmits a set of composite light. The composite display layer includes a display layer that provides a first subset of light included in the set of composite light, and a first mirror layer parallel to the first display layer that provides a second subset of light included in the set of composite light, where the second subset of light comprises a reflection of a first portion of the first subset of light. The composite display layer also includes a polarizer layer disposed on the composite display layer, where the polarizer layer provides the first portion of the first subset of light to the first mirror layer.

At least one technological advantage of the disclosed embodiments is that the composite display layer provides light over a larger area without enlarging the display layer. Further, the composite display layer enables various configurations for an optical assembly, where the composite display layer is at least as large as the lens coverage area for a lens, enabling the optical assembly to provide more light to the eye of the user.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Overview

In the following description, numerous specific details are set forth to provide a more thorough understanding of the various embodiments. However, it will be apparent to one of skilled in the art that the inventive concepts may be practiced without one or more of these specific details.

In various embodiments, an optical assembly, such as a wearable device included in a head-mounted display (HMD) or near-eye display (NED), may include a composite display layer that provides light to the user. Embodiments herein present composite display layers that provide sets of composite light to the user. The composite display layer includes a display layer and an adjacent mirror layer disposed substantially parallel to the display layer. The display layer provides a subset of light. A portion of the subset of light is reflected at the mirror layer, and the mirror layer reflects the portion of the subset of light. In some embodiments, a stack of one or more layers can be disposed onto a portion of the composite display layer. The stack of one or more layers can be one or more film layers and/or one or more polarizing layers. When the subset of light provided by the display layer is circularly-polarized, the stack of one or more layers can transmit one subset of the circularly-polarized light provided by the display layer. The stack of one or more layers can reflect a different subset of the circularly-polarized light to the mirror layer, as described below.

Composite Display Layer

Figure 1:
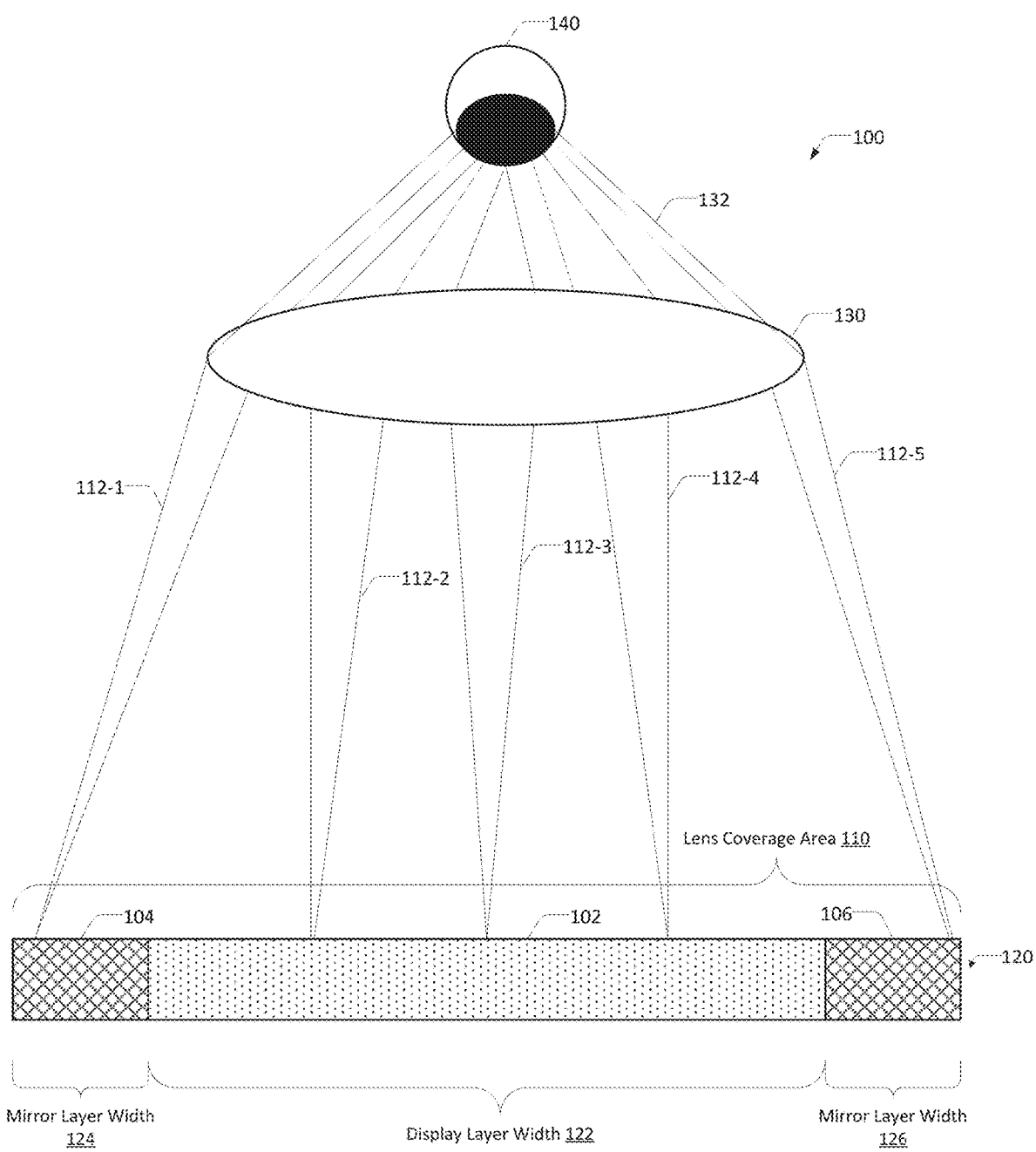
FIG. 1 illustrates a cross-section of a composite display system configured to implement one or more aspects of the present disclosure.

FIG. 1 illustrates a cross-section of a composite display system 100 configured to implement one or more aspects of the present disclosure. Composite display system 100 includes composite display layer 120 and lens 130. During operation, one or more pixels included in composite display layer 120 emit light rays 112 that propagate from composite display layer 120 through lens 130 to form a convergent set of light rays 132 within the field of view of a user that reach eye 140 of the user.

Composite display layer 120 includes display layer 102 and mirror layers 104 and 106. In various embodiments, one or more portions of composite display layer 102 provide light rays 112 (e.g., 112-1 to 112-5) to lens 130 in order to form an image. In some embodiments, mirror layers 104 and 106 can be placed adjacent to each side of display layer 102 and form a frame around display layer 102.

In some embodiments, composite display layer 120 can be configured to have an area greater than or equal to the lens coverage area 110 associated with lens 130. For example, composite display layer 120 could have a width equal to the sums of display layer width 122 and mirror layer widths 124 and 126. The width of composite display layer 120 could be greater than or equal to a diameter for a circle that defines lens coverage area 110. In some embodiments, the distance between composite display layer 120 and lens 130 may vary. For example, lens 130 may be a component of a multifocal assembly. In such instances, composite display layer 120 can be configured to have an area greater than or equal to the largest lens coverage area 110 associated with lens 130.

Display layer 102 includes one or more pixels that emit light rays. For example, display layer 102 could be a self-emitting display that causes pixels to emit light rays 112-2, 112-3, and 112-4, such as an organic light-emitting diode (OLED) or a direct LED liquid crystal display (LCD). In some embodiments, other light rays traverse through display layer 102. For example, a back-lit type LCD could be positioned next to a backlight that emit rays that traverse through display layer 102. In another example, ambient light rays emanating from an environment traverse through display layer 102. In some embodiments, one or more pixels included in display layer 102 may comprise a super pixel that includes a plurality of micro-pixels.

Mirror layers 104 and 106 reflect light rays emitted from a different light source. For example, mirror layers 104 and 106 could receive a portion of light rays emitted from display layer 102 and reflect the light rays 112-1 and 112-5, respectively, towards lens 130. Mirror layers 104 and 106 may include a reflective surface, coating, or display that reflects a portion of an incoming light ray. In some embodiments, one or more layers (not shown) may be disposed over at least a portion of mirror layers 104 and 106 and cause light rays to be directed towards mirror layers 104 and 106. In such instances, mirror layers 104 and 106 may reflect light rays 112-1 and 112-5 such that light rays 112-1 and 112-5 are transmitted through the one or more layers. In some embodiments, mirror layers 104 and 106 may reflect polarized light rays and modify the phase of the reflected polarized light rays.

Lens 130 is configured to magnify light rays 112 received from composite display layer 120. For example, lens 130 could receive light rays 112 provided by composite display layer 120 and provide a converged set of light rays 132 within the field of view of the user that traverse through space from lens 130 to eye 140 of the user. In some embodiments, lens 130 may comprise a micro-lens array.

Lens 130 has a corresponding lens coverage area 110. Lens coverage area 110 is the area of plane at a given distance away from lens 130 that the user is able to see through the lens. For example, when lens 130 is circular, lens coverage area 110 at a given distance can include the area within a circle at the plane parallel to lens 130 at the given distance. For composite display system 100, lens coverage area 110 can vary with distance. For example, lens coverage area 110 may grow as the distance between lens 130 and a given plane increases. As shown, composite display layer 120 is located at a distance where a diameter for lens coverage area 110 is equal to the total width of composite display layer 120.

Figure 2:
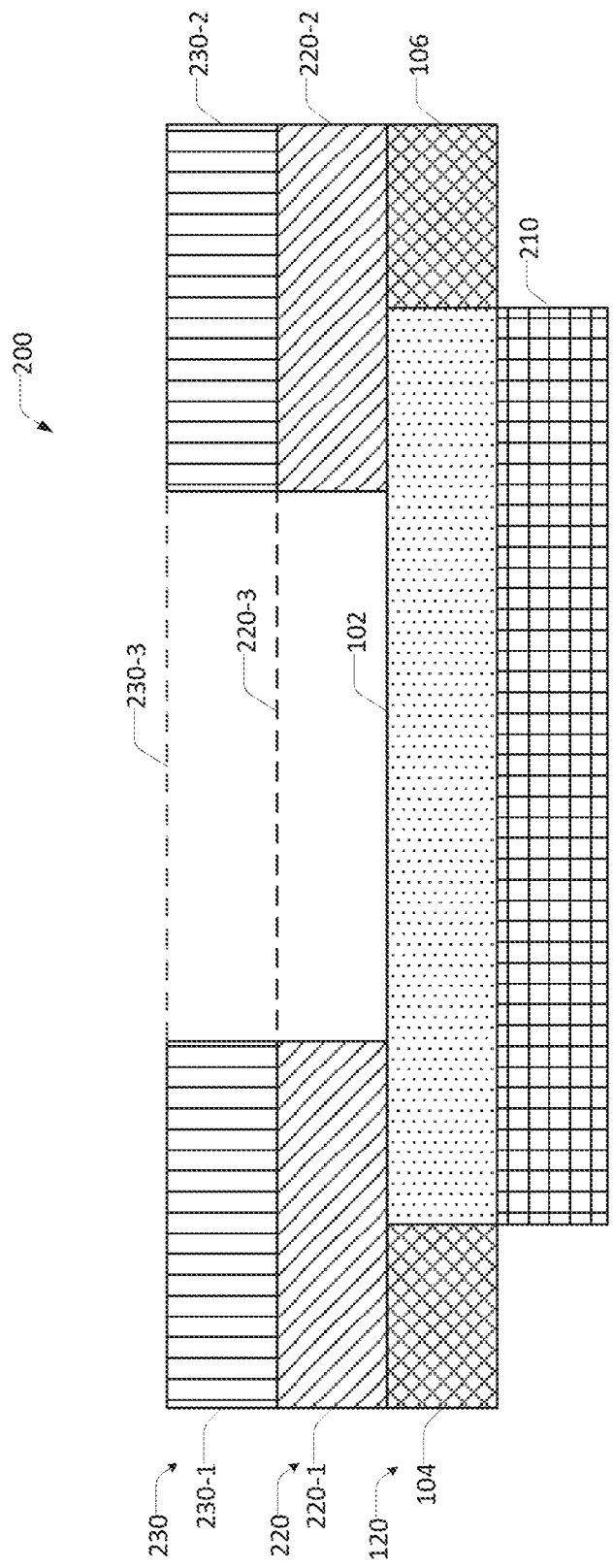
FIG. 2 is a schematic cross-sectional view a portion of a composite display system of FIG. 1, according to various embodiments of the present disclosure.

FIG. 2 is a schematic cross-sectional view 200 a portion of composite display system 100 of FIG. 1, according to various embodiments of the present disclosure. As shown, cross-sectional view 200 includes composite display layer 120, backlight layer 210, film layer 220, and polarizer layer 230. While cross-sectional view 200 includes layers 120, 210, 220, 230, any number of layers, including zero, are contemplated in various embodiments of this disclosure.

Backlight layer 210 can include one or more pixels that emit light rays. In some embodiments, backlight layer 210 can comprise a light-emitting diode (LED) field that causes one or more LED pixels to emit light rays. In various embodiments, backlight layer 210 can cause the one or more pixels to emit polarized and/or unpolarized light rays through display layer 210. In some embodiments, display layer 120 can be a self-emitting display. In such instances, backlight layer 210 may not be included in composite display system 100.

Film layer 220 (e.g., 220-1 to 220-3) provides light between composite display layer 120 and polarizer layer 230. In various embodiments, film layer 220 can be a retarder, such as a quarter-wave retarder plate, that modifies the phase of a light ray 112 traversing through film layer 220. In some embodiments, film layer 220 modifies light ray 112 such that the light ray 112 is separated into two polarized component light rays that are out of phase with one another. For example, when film layer 220 is a quarter-wave retarding plate, a light ray traversing through film layer 220 could be circularly polarized and could be separated into two separate, polarized light rays, including a p-polarized light ray and an s-polarized light ray.

In some embodiments, film layer 220 can include multiple portions. For example, film layer 220 can include retarding portions 220-1 and 220-2. Film layer can also include a window portion 220-3 that does not retard the phase of a light ray. In some embodiments, film layer 220 can be configured to include window portion 220-3 over at least a portion of display layer 102. In some embodiments, window portion 220-3 extends over all of display layer 102, and retarding portions 220-1 are disposed only adjacent to mirror layers 104 and 106. In some embodiments, film layer 220 can be comprised of a stack of two or more film layers. For example, two separate film layers can be stacked to form a composite film layer.

Polarizer layer 230 (e.g., 230-1 to 230-3) provides polarized light received from an adjacent layer. In some embodiments, polarizer layer 230 can be a reflective polarizer that reflects portions of polarized light and transmits other portions of polarized light. For example, polarizer layer 230 could be a reflective polarizer that transmits s-polarized light rays and reflects p-polarized light rays. In such instances, polarizer layer 230 can act as a wave plate and retard the phase of a p-polarized light ray that polarizer layer 230 reflects. In some embodiments, polarizer layer 230 could be a quarter-wavelength or a half-wavelength reflective polarizer. In such instances, polarizer layer 230 could reflect a p-polarized light ray and retard the phase of the p-polarized light ray by a quarter wavelength or by a half-wavelength, respectively.

In some embodiments, polarizer layer 230 can include multiple portions. For example, polarizer layer 230 can include reflecting portions 230-1 and 230-2. Polarizer layer 230 can also include a window portion 230-3 that does not reflect a light ray 112 or modify the phase of the light ray 112. In some embodiments, polarizer layer 230 can be configured to include window portion 230-3 over at least a portion of display layer 102. In some embodiments, window portion 230-3 extends over all of display layer 102 and reflecting portions 230-1 and 230-2 are disposed only on retarding portions 220-1 and 220-2, and/or mirror layers 104 and 106. In some embodiments, polarizer layer 230 can be comprised of a stack of two or more polarizer layers. For example, three separate 15-degree polarizing layers can be stacked to form a composite 45-degree polarizer layer 230.

Figures 3A, 3B, 3C:
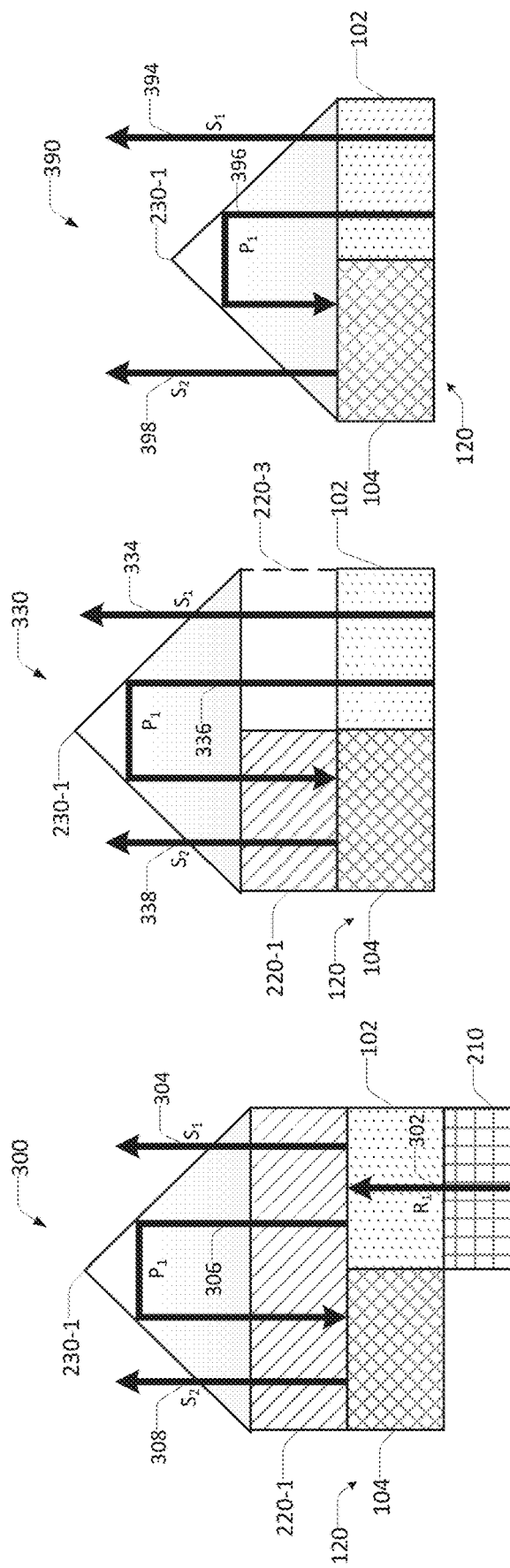
FIG. 3A illustrates a composite display system providing light at a composite display layer included in the composite display system of FIG. 1, according to various embodiments of the present disclosure.
FIG. 3B illustrates another composite display system providing light at a composite display layer included in the composite display system of FIG. 1, according to various embodiments of the present disclosure.
FIG. 3C illustrates another composite display system providing light at a composite display layer included in the composite display system of FIG. 1, according to various embodiments of the present disclosure.

FIG. 3A illustrates a composite display system 300 providing light at a composite display layer included in the composite display system 100 of FIG. 1, according to various embodiments of the present disclosure. As shown, composite display system 300 includes composite display layer 120, backlight layer 210, film layer 220, and polarizer layer 230. Composite layer 120 includes display layer 102 and mirror layer 104.

Backlight 210 produces a light ray $R_1$ 302 that travels through display layer 102. In various embodiments, display layer 102 can provide light ray $R_1$ 302. In some embodiments, light ray $R_1$ 302 is un-polarized light. In such instances, a linear polarized film (not shown) may be included between display layer 102 and film layer 220 may polarize light ray $R_1$ 302 to be linear polarized. In some embodiments, light ray $R_1$ 302 may be elliptical polarized light. In such instances both film layer 220 and a linear polarized film may optionally be included in composite display system 300. Alternatively, in some embodiments, light ray $R_1$ 302 may be circular polarized light. In such instances, film layer 220 may be removed.

When linear polarized light ray $R_1$ 302 traverses through film layer 220-1, film layer 220 modifies linear polarized light ray $R_1$ 302. For example, film layer 220 could be a quarter-wavelength retarder that separates light ray $R_1$ 302 into two separate component light rays, light ray $S_1$ 304 and light ray $P_1$ 306. In various embodiments, component light rays 304 and 306 are out of phase with one another. For example, when film layer 220 is a quarter-wavelength retarder, light ray $S_1$ 304 is one-quarter-wavelength out of phase from light ray $P_1$ 306.

Component light rays 304 and 306 traverse from film layer 220-1 through polarizer layer 230-1. Polarizer layer 230-1 reflects light ray $P_1$ 306 and transmits light ray $S_1$ 304. In various embodiments, polarizer layer 230-1 can be a circular polarizer that acts as a half-wave plate that reflects light ray $P_1$ 306 by one-half wavelength. For example, polarizer layer 230-1 could modify light ray $P_1$ 306 by one quarter wavelength when $P_1$ 306 first reflects from the surface included in polarizer layer 230-1. Polarizer layer 230-1 could then modify light ray $P_1$ 306 further by one quarter wavelength when $P_1$ 306 reflects from the another surface included in polarizer layer 230-1.

Light ray $P_1$ 306 traverses from polarizer layer 230-1 to film layer 220-1. Light ray $P_1$ 306 traverses through a different portion of film layer 220-1. Film layer 220-1 modifies light ray $P_1$ 306 by retarding light ray $P_1$ 306. For example, film layer 220 could be a quarter-wavelength retarder that slows the phase of light ray $P_1$ 306 by one-quarter wavelength.

In some embodiments, light ray $P_1$ 306 reaches mirror layer 104 in phase with light ray $S_1$ 304, or one-half wavelength out of phase with light ray $S_1$ 304. Mirror layer 104 reflects light ray $P_1$ 306, providing light ray $S_2$ 308 as the incident ray to light ray $P_1$ 306. Light ray $S_2$ 308 traverses through film layer 220-1 and polarizer layer 230-1 transmits light ray $S_2$ 308 in the same manner that polarizer layer 230-1 transmits light ray $S_1$ 304.

For example, film layer 220-1 could be a quarter-length retarder and polarizer layer 230-1 could modify light rays by one-half wavelength. In such instances, the stack of film layer 220-1 and polarizer layer 230-1 could modify the phase of light ray $P_1$ 306 to be in phase with light ray $S_1$ 304 when light ray $P_1$ 304 reaches mirror layer 104. Mirror layer could then reflect light ray $P_1$ 306 to provide light ray $S_2$ 308. In another example, film layer 220-1 could be a 45-degree retarder and polarizer layer 230-1 could modify light rays by 90 degrees. In such instances, the stack of film layer 220-1 and polarizer 230-1 could modify the phase of light ray $P_1$ 306 to be 180 degrees out of phase with light ray $S_1$ 304 when light ray $P_1$ 304 reaches mirror 124. Mirror layer could then reflect light ray $P_1$ 306 to provide light ray $S_2$ 308.

FIG. 3B illustrates another composite display system 330 providing light at a composite display layer included in the composite display system of FIG. 1, according to various embodiments of the present disclosure. As shown, composite display system 330 includes composite display layer 120, backlight layer 210, film layer 220, and polarizer layer 230. Composite layer 120 includes display layer 102 and mirror layer 104.

In operation, display layer 102 provides a polarized light ray that includes separate component light rays, light ray $S_1$ 334 and light ray $P_1$ 336. In various embodiments, film layer 220 can include a film portion 220-1 that is disposed upon mirror layer 104, and a window portion 220-3 disposed upon display layer 102. In such instances, window portion 220-3 can be comprised of material that does not retard the phase of component light rays 334 and 336.

Component light rays 334 and 336 traverse from window portion 220-3 through polarizer layer 230-1. Polarizer layer 230-1 reflects light ray $P_1$ 336 and transmits light ray $S_1$ 334. Polarizer layer 230-1 reflects light ray $P_1$ 336 towards film portion 220-1. Light ray $P_1$ 336 then traverses through film portion 220-1. Film portion 220-1 modifies light ray $P_1$ 336 by retarding light ray $P_1$ 336. For example, film portion 220-1 could be a quarter-wavelength retarder that slows the phase of light ray $P_1$ 336 by one-quarter wavelength. Light ray $P_1$ 336 reaches mirror layer 104 in phase with light ray $S_1$ 334, or one-half wavelength out of phase with light ray $S_1$ 334. Mirror layer 104 reflects light ray $P_1$ 336, providing light ray $S_2$ 338 as the incident ray to light ray P1 336. Light ray $S_2$ 338 traverses through film portion 220-1 and polarizer layer 230-1 transmits light ray $S_2$ 338 in the same manner that polarizer layer 230-1 transmits light ray $S_1$ 334.

FIG. 3C illustrates another composite display system 390 providing light at a composite display layer 120 included in the composite display system 100 of FIG. 1, according to various embodiments of the present disclosure. As shown, composite display system 390 includes composite display layer 120 and polarizer layer 230. Composite layer 120 includes display layer 102 and mirror layer 104. In operation, display layer 102 provides a polarized light ray that includes separate component light rays, light ray $S_1$ 394 and light ray $P_1$ 396. In various embodiments, polarizer layer 230-1 is disposed on composite display layer 120.

Polarizer layer 230-1 reflects light ray $P_1$ 396 and transmits light ray $S_1$ 394. In various embodiments, polarizer layer 230-1 can be a reflective polarizer that reflects light ray $P_1$ 336 towards mirror layer 104. Mirror layer 104 reflects light ray $P_1$ 396, providing light ray $S_2$ 398 as the incident ray to light ray $P_1$ 396. Polarizer layer 230-1 transmits light ray $S_2$ 398 in the same manner that polarizer layer 230-1 transmits light ray $S_1$ 334.

FIGS. 3A-3C illustrate embodiments that include different configurations of composite display system 100. In various embodiments, one or more of the components described as included in composite display systems 300, 330, and 390 can be combined in other configurations of composite display system 100. Any and all combinations of the components described in composite display systems 300, 330, and 390 fall within the contemplated scope of the present disclosure.

The Artificial Reality System

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or near-eye display (NED) connected to a host computer system, a standalone HMD or NED, a mobile device or computing system, or any other hardware platform capable of providing artificial reality content to one or more viewers.

Figure 4:
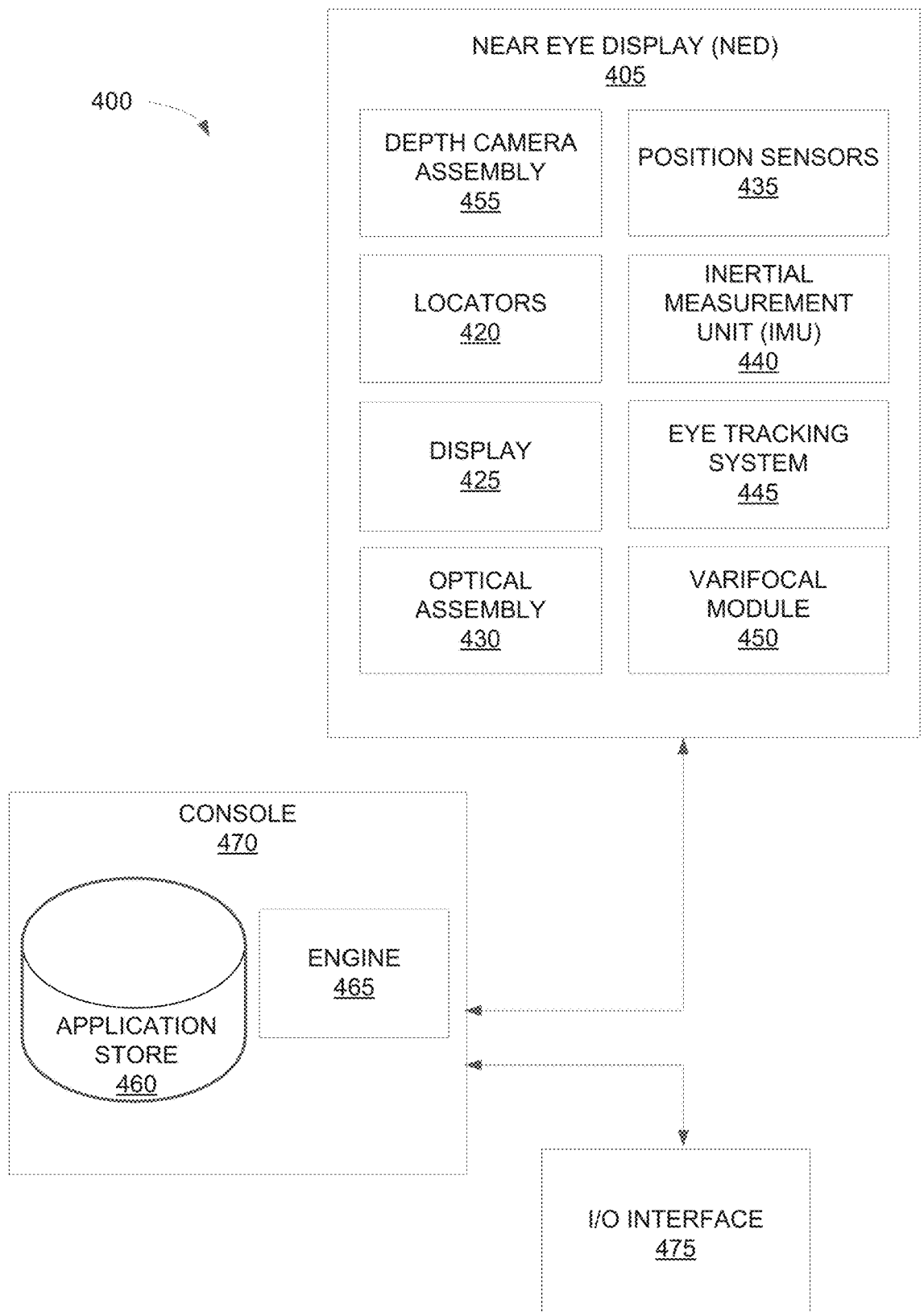
FIG. 4 is a block diagram of an embodiment of a near-eye display (NED) system in which a console operates, according to various embodiments.

FIG. 4 is a block diagram of an embodiment of a near-eye display (NED) system 400 in which a console operates, according to various embodiments. The NED system 400 may operate in a virtual reality (VR) system environment, an augmented reality (AR) system environment, a mixed reality (MR) system environment, or some combination thereof. The NED system 400 shown in FIG. 4 comprises a NED 405 and an input/output (I/O) interface 475 that is coupled to the console 470. In various embodiments, the composite display system 100 is included in or operates in conjunction with the NED system 400. For example, the composite display system 100 may be included within NED 405 or may be coupled to the console 470 and/or the NED 405.

While FIG. 4 shows an example NED system 400 including one NED 405 and one I/O interface 475, in other embodiments any number of these components may be included in the NED system 400. For example, there may be multiple NEDs 405, and each NED 405 has an associated I/O interface 475. Each NED 405 and I/O interface 475 communicates with the console 470. In alternative configurations, different and/or additional components may be included in the NED system 400. Additionally, various components included within the NED 405, the console 470, and the I/O interface 475 may be distributed in a different manner than is described in conjunction with FIGS. 1-3B in some embodiments. For example, some or all of the functionality of the console 470 may be provided by the NED 405 and vice versa.

The NED 405 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 405 may also present audio content to a user. The NED 405 and/or the console 470 may transmit the audio content to an external device via the I/O interface 475. The external device may include various forms of speaker systems and/or headphones. In various embodiments, the audio content is synchronized with visual content being displayed by the NED 405.

The NED 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 4, the NED 405 may include a depth camera assembly (DCA) 455, one or more locators 420, a display 425, an optical assembly 430, one or more position sensors 435, an inertial measurement unit (IMU) 440, an eye tracking system 445, and a varifocal module 450. In some embodiments, the display 425 and the optical assembly 430 can be integrated together into a projection assembly. Various embodiments of the NED 405 may have additional, fewer, or different components than those listed above. Additionally, the functionality of each component may be partially or completely encompassed by the functionality of one or more other components in various embodiments.

The DCA 455 captures sensor data describing depth information of an area surrounding the NED 405. The sensor data may be generated by one or a combination of depth imaging techniques, such as triangulation, structured light imaging, time-of-flight imaging, stereo imaging, laser scan, and so forth. The DCA 455 can compute various depth properties of the area surrounding the NED 405 using the sensor data. Additionally or alternatively, the DCA 455 may transmit the sensor data to the console 470 for processing. Further, in various embodiments, the DCA 455 captures or samples sensor data at different times. For example, the DCA 455 could sample sensor data at different times within a time window to obtain sensor data along a time dimension.

The DCA 455 includes an illumination source, an imaging device, and a controller. The illumination source emits light onto an area surrounding the NED 405. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 405, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 420 are objects located in specific positions on the NED 405 relative to one another and relative to a specific reference point on the NED 405. A locator 420 may be a light emitting diode (LED), a corner cube reflector, a reflective marker, a type of light source that contrasts with an environment in which the NED 405 operates, or some combination thereof. In embodiments where the locators 420 are active (i.e., an LED or other type of light emitting device), the locators 420 may emit light in the visible band (~380 nm to 950 nm), in the infrared (IR) band (~950 nm to 9700 nm), in the ultraviolet band (70 nm to 380 nm), some other portion of the electromagnetic spectrum, or some combination thereof.

In some embodiments, the locators 420 are located beneath an outer surface of the NED 405, which is transparent to the wavelengths of light emitted or reflected by the locators 420 or is thin enough not to substantially attenuate the wavelengths of light emitted or reflected by the locators 420. Additionally, in some embodiments, the outer surface or other portions of the NED 405 are opaque in the visible band of wavelengths of light. Thus, the locators 420 may emit light in the IR band under an outer surface that is transparent in the IR band but opaque in the visible band.

The display 425 displays two-dimensional or three-dimensional images to the user in accordance with pixel data received from the console 470 and/or one or more other sources. In various embodiments, the display 425 comprises a single display or multiple displays (e.g., separate displays for each eye of a user). In some embodiments, the display 425 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the displays types may be incorporated in display 425 and used separately, in parallel, and/or in combination.

The optical assembly 430 magnifies image light received from the display 425, corrects optical errors associated with the image light, and presents the corrected image light to a user of the NED 405. The optical assembly 430 includes a plurality of optical elements. For example, one or more of the following optical elements may be included in the optical assembly 430: an aperture, a Fresnel lens, a convex lens, a concave lens, a filter, a reflecting surface, or any other suitable optical element that deflects, reflects, refracts, and/or in some way alters image light. Moreover, the optical assembly 430 may include combinations of different optical elements. In some embodiments, one or more of the optical elements in the optical assembly 430 may have one or more coatings, such as partially reflective or antireflective coatings.

In some embodiments, the optical assembly 430 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 425 is pre-distorted, and the optical assembly 430 corrects the distortion as image light from the display 425 passes through various optical elements of the optical assembly 430. In some embodiments, optical elements of the optical assembly 430 are integrated into the display 425 as a projection assembly that includes at least one waveguide coupled with one or more optical elements.

The IMU 440 is an electronic device that generates data indicating a position of the NED 405 based on measurement signals received from one or more of the position sensors 435 and from depth information received from the DCA 455. In some embodiments of the NED 405, the IMU 440 may be a dedicated hardware component. In other embodiments, the IMU 440 may be a software component implemented in one or more processors.

In operation, a position sensor 435 generates one or more measurement signals in response to a motion of the NED 405. Examples of position sensors 435 include: one or more accelerometers, one or more gyroscopes, one or more magnetometers, one or more altimeters, one or more inclinometers, and/or various types of sensors for motion detection, drift detection, and/or error detection. The position sensors 435 may be located external to the IMU 440, internal to the IMU 440, or some combination thereof.

Based on the one or more measurement signals from one or more position sensors 435, the IMU 440 generates data indicating an estimated current position of the NED 405 relative to an initial position of the NED 405. For example, the position sensors 435 include multiple accelerometers to measure translational motion (forward/back, up/down, left/right) and multiple gyroscopes to measure rotational motion (e.g., pitch, yaw, and roll). In some embodiments, the IMU 440 rapidly samples the measurement signals and calculates the estimated current position of the NED 405 from the sampled data. For example, the IMU 440 integrates the measurement signals received from the accelerometers over time to estimate a velocity vector and integrates the velocity vector over time to determine an estimated current position of a reference point on the NED 405. Alternatively, the IMU 440 provides the sampled measurement signals to the console 470, which analyzes the sample data to determine one or more measurement errors. The console 470 may further transmit one or more of control signals and/or measurement errors to the IMU 440 to configure the IMU 440 to correct and/or reduce one or more measurement errors (e.g., drift errors). The reference point is a point that may be used to describe the position of the NED 405. The reference point may generally be defined as a point in space or a position related to a position and/or orientation of the NED 405.

In various embodiments, the IMU 440 receives one or more parameters from the console 470. The one or more parameters are used to maintain tracking of the NED 405. Based on a received parameter, the IMU 440 may adjust one or more IMU parameters (e.g., a sample rate). In some embodiments, certain parameters cause the IMU 440 to update an initial position of the reference point so that it corresponds to a next position of the reference point. Updating the initial position of the reference point as the next calibrated position of the reference point helps reduce drift errors in detecting a current position estimate of the IMU 440.

In various embodiments, the eye tracking system 445 is integrated into the NED 405. The eye-tracking system 445 may comprise one or more illumination sources (e.g., infrared illumination source, visible light illumination source) and one or more imaging devices (e.g., one or more cameras). In operation, the eye tracking system 445 generates and analyzes tracking data related to a user's eyes as the user wears the NED 405. In various embodiments, the eye tracking system 445 estimates the angular orientation of the user's eye. The orientation of the eye corresponds to the direction of the user's gaze within the NED 405. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 8° laterally and ±4° vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 445 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 405 on a user's head. The eye tracking system 445 may also detect the torsion of the eye, i.e., rotation of the eye about the pupillary axis. The eye tracking system 445 may use the detected torsion of the eye to estimate the orientation of the foveal axis from the pupillary axis. The eye tracking system 445 may also track a change in the shape of the eye, which may be approximated as a skew or scaling linear transform or a twisting distortion (e.g., due to torsional deformation). The eye tracking system 445 may estimate the foveal axis based on some combination of the angular orientation of the pupillary axis, the translation of the eye, the torsion of the eye, and the current shape of the eye.

As the orientation may be determined for both eyes of the user, the eye tracking system 445 is able to determine where the user is looking. The NED 405 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and though the point halfway between the pupils of the user's eyes.

In some embodiments, the varifocal module 450 is integrated into the NED 405. The varifocal module 450 may be communicatively coupled to the eye tracking system 445 in order to enable the varifocal module 450 to receive eye tracking information from the eye tracking system 445. The varifocal module 450 may further modify the focus of image light emitted from the display 425 based on the eye tracking information received from the eye tracking system 445. Accordingly, the varifocal module 450 can reduce vergence-accommodation conflict that may be produced as the user's eyes resolve the image light. In various embodiments, the varifocal module 450 can be interfaced (e.g., either mechanically or electrically) with at least one optical element of the optical assembly 430.

In operation, the varifocal module 450 may adjust the position and/or orientation of one or more optical elements in the optical assembly 430 in order to adjust the focus of image light propagating through the optical assembly 430. In various embodiments, the varifocal module 450 may use eye tracking information obtained from the eye tracking system 445 to determine how to adjust one or more optical elements in the optical assembly 430. In some embodiments, the varifocal module 450 may perform foveated rendering of the image light based on the eye tracking information obtained from the eye tracking system 445 in order to adjust the resolution of the image light emitted by the display 425. In this case, the varifocal module 450 configures the display 425 to display a high pixel density in a foveal region of the user's eye-gaze and a low pixel density in other regions of the user's eye-gaze.

The I/O interface 475 facilitates the transfer of action requests from a user to the console 470. In addition, the I/O interface 475 facilitates the transfer of device feedback from the console 470 to the user. An action request is a request to perform a particular action. For example, an action request may be an instruction to start or end capture of image or video data or an instruction to perform a particular action within an application, such as pausing video playback, increasing or decreasing the volume of audio playback, and so forth. In various embodiments, the I/O interface 475 may include one or more input devices. Example input devices include: a keyboard, a mouse, a game controller, a joystick, and/or any other suitable device for receiving action requests and communicating the action requests to the console 470. In some embodiments, the I/O interface 475 includes an IMU 440 that captures calibration data indicating an estimated current position of the I/O interface 475 relative to an initial position of the I/O interface 475.

In operation, the I/O interface 475 receives action requests from the user and transmits those action requests to the console 470. Responsive to receiving the action request, the console 470 performs a corresponding action. For example, responsive to receiving an action request, console 470 may configure I/O interface 475 to emit haptic feedback onto an arm of the user. For example, console 475 may configure I/O interface 475 to deliver haptic feedback to a user when an action request is received. Additionally or alternatively, the console 470 may configure the I/O interface 475 to generate haptic feedback when the console 470 performs an action, responsive to receiving an action request.

The console 470 provides content to the NED 405 for processing in accordance with information received from one or more of: the DCA 455, the eye tracking system 445, one or more other components of the NED 405, and the I/O interface 475. In the embodiment shown in FIG. 4, the console 470 includes an application store 460 and an engine 465. In some embodiments, the console 470 may have additional, fewer, or different modules and/or components than those described in conjunction with FIG. 4. Similarly, the functions further described below may be distributed among components of the console 470 in a different manner than described in conjunction with FIG. 4.

The application store 460 stores one or more applications for execution by the console 470. An application is a group of instructions that, when executed by a processor, performs a particular set of functions, such as generating content for presentation to the user. For example, an application may generate content in response to receiving inputs from a user (e.g., via movement of the NED 405 as the user moves his/her head, via the I/O interface 475, etc.). Examples of applications include: gaming applications, conferencing applications, video playback applications, or other suitable applications.

In some embodiments, the engine 465 generates a three-dimensional mapping of the area surrounding the NED 405 (i.e., the "local area") based on information received from the NED 405. In some embodiments, the engine 465 determines depth information for the three-dimensional mapping of the local area based on depth data received from the NED 405. In various embodiments, the engine 465 uses depth data received from the NED 405 to update a model of the local area and to generate and/or modify media content based in part on the updated model of the local area.

The engine 465 also executes applications within the NED system 400 and receives position information, acceleration information, velocity information, predicted future positions, or some combination thereof, of the NED 405. Based on the received information, the engine 465 determines various forms of media content to transmit to the NED 405 for presentation to the user. For example, if the received information indicates that the user has looked to the left, the engine 465 generates media content for the NED 405 that mirrors the user's movement in a virtual environment or in an environment augmenting the local area with additional media content. Accordingly, the engine 465 may generate and/or modify media content (e.g., visual and/or audio content) for presentation to the user. The engine 465 may further transmit the media content to the NED 405. Additionally, in response to receiving an action request from the I/O interface 475, the engine 465 may perform an action within an application executing on the console 470. The engine 465 may further provide feedback when the action is performed. For example, the engine 465 may configure the NED 405 to generate visual and/or audio feedback and/or the I/O interface 475 to generate haptic feedback to the user.

In some embodiments, based on the eye tracking information (e.g., orientation of the user's eye) received from the eye tracking system 445, the engine 465 determines a resolution of the media content provided to the NED 405 for presentation to the user on the display 425. The engine 465 may adjust a resolution of the visual content provided to the NED 405 by configuring the display 425 to perform foveated rendering of the visual content, based at least in part on a direction of the user's gaze received from the eye tracking system 445. The engine 465 provides the content to the NED 405 having a high resolution on the display 425 in a foveal region of the user's gaze and a low resolution in other regions, thereby reducing the power consumption of the NED 405. In addition, using foveated rendering reduces a number of computing cycles used in rendering visual content without compromising the quality of the user's visual experience. In some embodiments, the engine 465 can further use the eye tracking information to adjust a focus of the image light emitted from the display 425 in order to reduce vergence-accommodation conflicts.

Figure 5A:
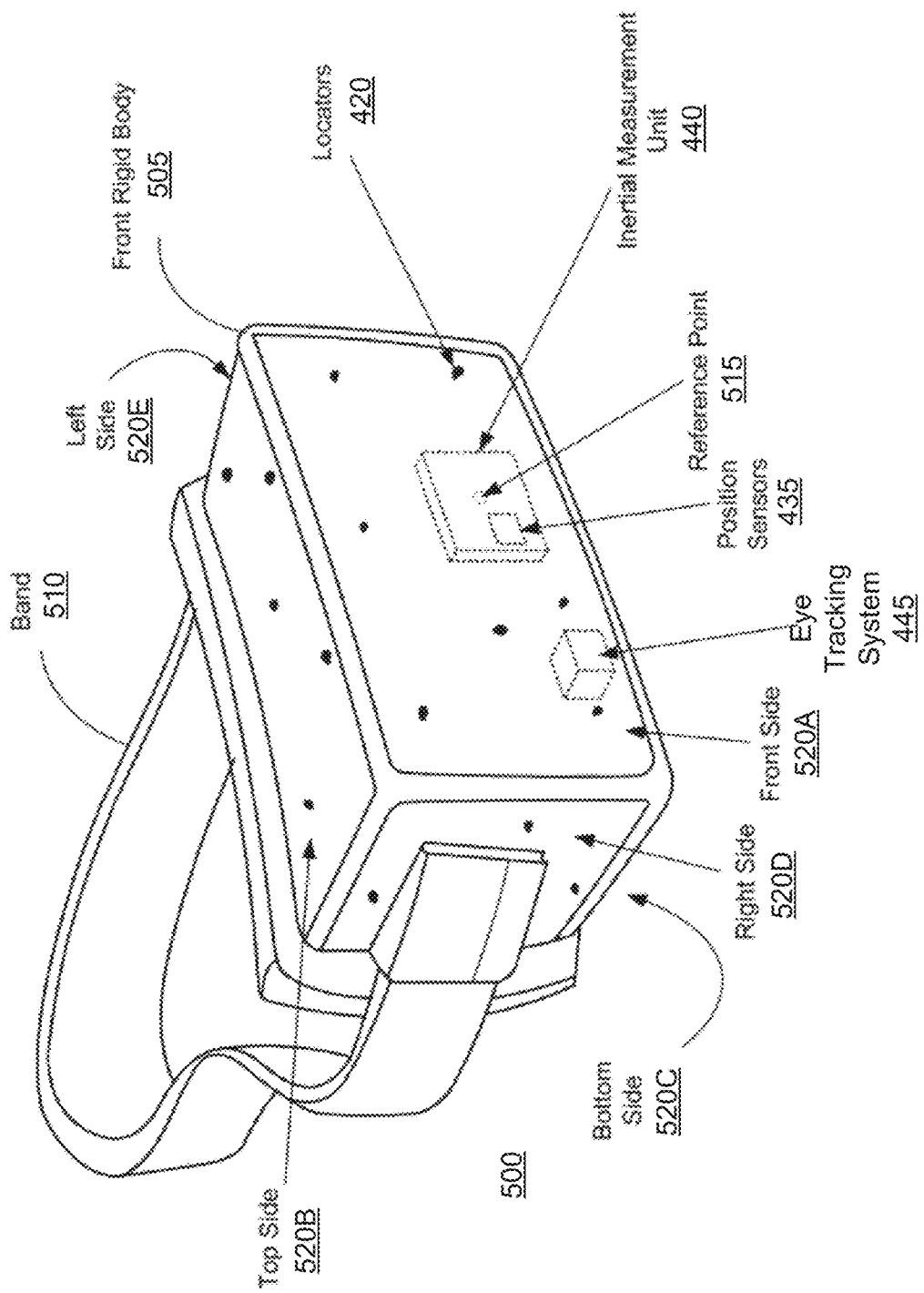
FIG. 5A is a diagram of an NED, according to various embodiments.

FIG. 5A is a diagram of an NED 500, according to various embodiments. In various embodiments, NED 500 presents media to a user. The media may include visual, auditory, and haptic content. In some embodiments, NED 500 provides artificial reality (e.g., virtual reality) content by providing a real-world environment and/or computer-generated content. In some embodiments, the computer-generated content may include visual, auditory, and haptic information. The NED 500 is an embodiment of the NED 405 and includes a front rigid body 505 and a band 510. The front rigid body 505 includes an electronic display element of the electronic display 425 (not shown in FIG. 5A), the optics assembly 430 (not shown in FIG. 5A), the IMU 440, the one or more position sensors 435, the eye tracking system 445, and the locators 420. In the embodiment shown by FIG. 5A, the position sensors 435 are located within the IMU 440, and neither the IMU 440 nor the position sensors 435 are visible to the user.

The locators 420 are located in fixed positions on the front rigid body 505 relative to one another and relative to a reference point 515. In the example of FIG. 5A, the reference point 515 is located at the center of the IMU 440. Each of the locators 420 emits light that is detectable by the imaging device in the DCA 455. The locators 420, or portions of the locators 420, are located on a front side 520A, a top side 520B, a bottom side 520C, a right side 520D, and a left side 520E of the front rigid body 505 in the example of FIG. 5A.

The NED 500 includes the eye tracking system 445. As discussed above, the eye tracking system 445 may include a structured light generator that projects an interferometric structured light pattern onto the user's eye and a camera to detect the illuminated portion of the eye. The structured light generator and the camera may be located off the axis of the user's gaze. In various embodiments, the eye tracking system 445 may include, additionally or alternatively, one or more time-of-flight sensors and/or one or more stereo depth sensors. In FIG. 5A, the eye tracking system 445 is located below the axis of the user's gaze, although the eye tracking system 445 can alternately be placed elsewhere. Also, in some embodiments, there is at least one eye tracking unit for the left eye of the user and at least one tracking unit for the right eye of the user.

In various embodiments, the eye tracking system 445 includes one or more cameras on the inside of the NED 500. The camera(s) of the eye tracking system 445 may be directed inwards, toward one or both eyes of the user while the user is wearing the NED 500, so that the camera(s) may image the eye(s) and eye region(s) of the user wearing the NED 500. The camera(s) may be located off the axis of the user's gaze. In some embodiments, the eye tracking system 445 includes separate cameras for the left eye and the right eye (e.g., one or more cameras directed toward the left eye of the user and, separately, one or more cameras directed toward the right eye of the user).

Figure 5B:
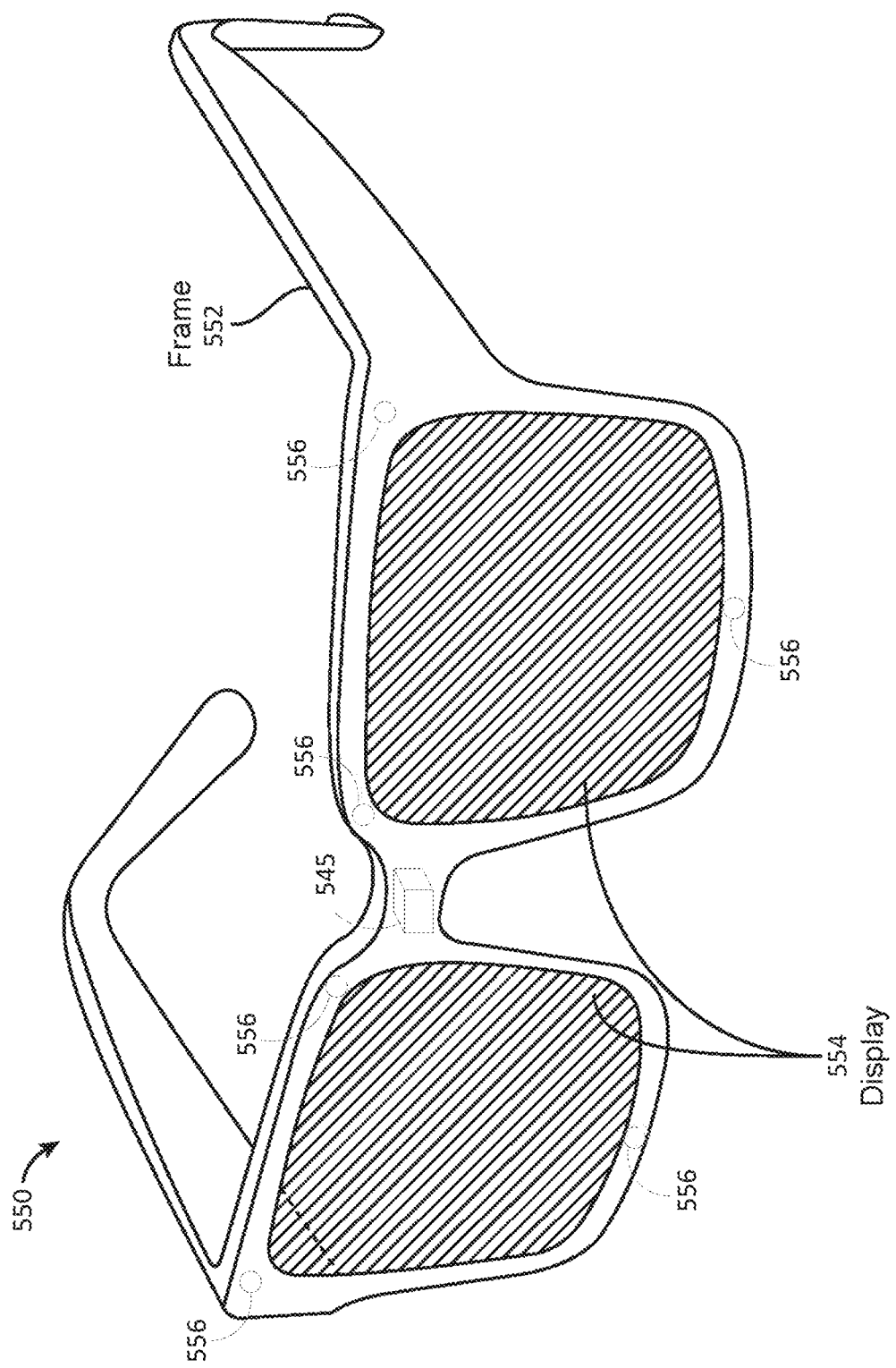
FIG. 5B is another diagram of an NED, according to various embodiments.

FIG. 5B is a diagram of an NED 550, according to various embodiments. In various embodiments, NED 550 presents media to a user. The media may include visual, auditory, and haptic content. In some embodiments, NED 550 provides artificial reality (e.g., augmented reality) content by providing a real-world environment and/or computer-generated content. In some embodiments, the computer-generated content may include visual, auditory, and haptic information. The NED 500 is an embodiment of the NED 405.

NED 550 includes frame 552 and display 554. In various embodiments, the NED 550 may include one or more additional elements. Display 554 may be positioned at different locations on the NED 250 than the locations illustrated in FIG. 5B. Display 554 is configured to provide content to the user, including audiovisual content. In some embodiments, one or more displays 554 may be located within frame 552.

NED 550 further includes eye tracking system 445 and one or more corresponding modules 556. The modules 556 may include emitters (e.g., light emitters) and/or sensors (e.g., image sensors, cameras). In various embodiments, the modules 556 are arranged at various positions along the inner surface of the frame 552, so that the modules 556 are facing the eyes of a user wearing the NED 550. For example, the modules 556 could include emitters that emit structured light patterns onto the eyes and image sensors to capture images of the structured light pattern on the eyes. As another example, the modules 556 could include multiple time-of-flight sensors for directing light at the eyes and measuring the time of travel of the light at each pixel of the sensors. As a further example, the modules 556 could include multiple stereo depth sensors for capturing images of the eyes from different vantage points. In various embodiments, the modules 556 also include image sensors for capturing 2D images of the eyes.

In sum, various embodiments set forth a composite display system configured with a composite display layer that provides light for a lens coverage area. The composite display layer includes a display layer and an adjacent mirror layer parallel to the display layer. The display layer provides a subset of light. A portion of the subset of light is reflected at the mirror layer, and the mirror layer reflects a portion of the subset of light.

In some embodiments, a stack of one or more layers can be disposed onto a portion of the composite display layer. The stack of one or more layers can be one or more film layers and/or one or more polarizing layers. When the subset of light provided by the display layer is circularly-polarized, the stack of one or more layers can transmit one subset of the circularly-polarized light provided by the display layer. The stack of one or more layers can reflect a different subset of the circularly-polarized light to the mirror layer.

At least one technological advantage of the disclosed embodiments is that the composite display layer provides light over a larger area without enlarging the display layer. Further, the composite display layer enables various configurations for an optical assembly where the composite display layer is at least as large as the lens coverage area for a lens, enabling the optical assembly to provide more light to the eye of the user.

1. In some embodiments, an apparatus comprises a composite display layer that transmits a set of composite light, the composite display layer includes a display layer that provides a first subset of light included in the set of composite light, and a first mirror layer parallel to the first display layer that provides a second subset of light included in the set of composite light, where the second subset of light comprises a reflection of a first portion of the first subset of light, and a polarizer layer disposed on the composite display layer, wherein the polarizer layer provides the first portion of the first subset of light to the first mirror layer.

2. The apparatus of clause 1, further comprising a film layer interposed between the polarizer layer and the first mirror layer, where the film layer retards the first portion of the first subset of light provided to the first mirror layer.

3. The apparatus of clause 1 or 2, where the film layer is interposed between the polarizer layer and at least a portion of the display layer.

4. The apparatus of any of clauses 1-3, where the polarizer layer comprises a quarter-wavelength circular polarizer and the film layer comprises a quarter-wavelength retardant film layer.

5. The apparatus of any of clauses 1-4, where the set of composite light comprises a set of circularly-polarized waves, the first portion of the first subset of light comprises a set of p-polarized waves provided by the polarizer layer to the first mirror layer, and the second subset of light comprises a set of s-polarized waves that are generated when the first portion of the first subset of light is reflected by the first mirror layer.

6. The apparatus of any of clauses 1-5, where the polarizer layer comprises a polarized portion that is disposed over at least the first mirror layer, and a window portion that is disposed over at least a portion of the display layer.

7. The apparatus of any of clauses 1-6, where the polarizer layer comprises a circular polarizer that includes a stack of two or more polarized layers.

8. The apparatus of any of clauses 1-7, wherein the composite display layer further comprises a second mirror layer parallel to the first display layer and the first mirror layer, and the display layer is interposed between the first mirror layer and the second mirror layer.

9. In some embodiments, a system comprises a wearable device that provides a light field, the wearable device comprising a composite display layer configured to transmit a set of composite light, the composite display layer including a display layer that provides a first subset of light included in the set of composite light, and a first mirror layer parallel to the first display layer that provides a second subset of light included in the set of composite light, wherein the second subset of light comprises a reflection of a first portion of the first subset of light, and a controller configured to cause the composite display layer to transmit the set of composite light.

10. The system of clause 9, where the wearable device further comprises a polarizer layer disposed on the composite display layer, wherein the polarizer layer is configured to provide the first portion of the first subset of light to the first mirror layer.

11. The system of clause 9 or 10, where the polarizer layer comprises a polarized portion that is disposed over at least the first mirror layer, and a window portion that is disposed over at least a portion of the display layer.

12. The system of any of clauses 9-11, where the set of composite light comprises a set of non-polarized waves.

13. The system of any of clauses 9-12, where the wearable device further comprises a film layer interposed between the polarizer layer and the first mirror layer, and the film layer retards the first portion of the first subset of light provided to the first mirror layer.

14. The system of any of clauses 9-13, where the film layer is interposed between the polarizer layer and at least a portion of the display layer.

15. The system of any of clauses 9-14, where the polarizer layer comprises a quarter-wavelength circular polarizer and the film layer comprises a quarter-wavelength retardant film layer.

16. The system of any of clauses 9-15, where the wearable device further comprises a first lens located adjacent to the display, and an area of the composite display layer is at least as large as a lens coverage area for the first lens.

17. The system of any of clauses 9-16, where the wearable device further comprises a backlight layer configured to emit light that causes the composite display layer to transmit the set of composite light, wherein the display layer is disposed on the backlight layer.

18. The system of any of clauses 9-17, where the composite display layer further comprises a second mirror layer parallel to the first display layer and the first mirror layer, and the display layer is interposed between the first mirror layer and the second mirror layer.

19. In some embodiments, a wearable device provides a light field, the wearable device comprising a composite display layer configured to transmit a set of composite light, the composite display layer including a display layer that provides a first subset of light included in the set of composite light, and a first mirror layer parallel to the first display layer that provides a second subset of light included in the set of composite light, where the second subset of light comprises a reflection of a first portion of the first subset of light.

20. The wearable device of clause 19, where the set of composite light comprises a set of circularly-polarized waves, the first portion of the first subset of light comprises a set of p-polarized waves provided by the polarizer layer to the first mirror layer, and the second subset of light comprises a set of s-polarized waves that are generated when the first portion of the first subset of light is reflected by the first mirror layer.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. An apparatus comprising:
   a composite display layer that transmits a set of composite light, the composite display layer including:
      a first display layer that provides a first subset of light included in the set of composite light, and
      a first mirror layer that resides adjacent to the first display layer within a plane of the composite display layer and provides a second subset of light included in the set of composite light, wherein the second subset of light comprises a reflection of a first portion of light transmitted by the first display layer; and a polarizer layer disposed on the composite display layer, wherein the polarizer layer provides the first portion of the light transmitted by the first display layer to the first mirror layer.

2. The apparatus of claim 1, further comprising a film layer interposed between the polarizer layer and the first mirror layer, wherein the film layer retards the first portion of the first subset of light provided to the first mirror layer.

3. The apparatus of claim 2, wherein the film layer is interposed between the polarizer layer and at least a portion of the first display layer.

4. The apparatus of claim 2, wherein the polarizer layer comprises a quarter-wavelength circular polarizer and the film layer comprises a quarter-wavelength retardant film layer.

5. The apparatus of claim 1, wherein:
the set of composite light comprises a set of circularly-polarized waves,
the first portion of the first subset of light comprises a set of p-polarized waves provided by the polarizer layer to the first mirror layer, and
the second subset of light comprises a set of s-polarized waves that are generated when the first portion of the first subset of light is reflected by the first mirror layer.

6. The apparatus of claim 1, wherein the polarizer layer comprises:
a polarized portion that is disposed over at least the first mirror layer; and
a window portion that is disposed over at least a portion of the first display layer.

7. The apparatus of claim 1, wherein the polarizer layer comprises a circular polarizer that includes a stack of two or more polarized layers.

8. The apparatus of claim 1, wherein the composite display layer further comprises a second mirror layer parallel to the first display layer and the first mirror layer, and the first display layer is interposed between the first mirror layer and the second mirror layer.

\* \* \* \* \*